United States Patent [19]

Gamarra

[11] Patent Number: 4,942,270
[45] Date of Patent: Jul. 17, 1990

[54] CABLE SEALING APPARATUS COMPRISING HEAT RESISTANT GEL COMPOSITIONS

[75] Inventor: Jose P. Gamarra, Union City, Calif.

[73] Assignee: Raychem Corporation, Menlo Park, Calif.

[21] Appl. No.: 217,798

[22] Filed: Jul. 12, 1988

Related U.S. Application Data

[63] Continuation-in-part of Ser. No. 72,309, Jul. 13, 1987, abandoned.

[51] Int. Cl.$^5$ .............................................. H02G 15/08
[52] U.S. Cl. ................................. 174/93; 174/77 R; 174/91; 174/92
[58] Field of Search ............... 174/91, 92, 93, 77 R, 174/41; 524/505, 173

[56] References Cited

U.S. PATENT DOCUMENTS

| | | | |
|---|---|---|---|
| 905,347 | 12/1908 | McMeen | 174/41 |
| 3,337,681 | 8/1967 | Smith | 174/93 |
| 3,339,011 | 8/1967 | Ewers, Jr. et al. | 174/93 |
| 3,485,787 | 12/1969 | Haefele et al. | 260/33.6 |
| 3,545,773 | 12/1970 | Smith | 174/92 X |
| 3,676,384 | 7/1972 | Rheineck | 260/23 EP |
| 3,753,287 | 8/1973 | Ziemek et al. | 174/21 C X |
| 3,827,999 | 8/1974 | Crossland | 260/33.6 AQ |
| 3,846,575 | 11/1974 | Troy | 174/41 |
| 4,176,240 | 11/1979 | Sabia | 174/23 C |
| 4,259,540 | 3/1981 | Sabia | 524/505 |
| 4,369,284 | 1/1983 | Chen | 524/505 |
| 4,421,945 | 12/1983 | Moisson | 174/92 |
| 4,492,428 | 1/1985 | Levy | 574/505 |
| 4,504,699 | 3/1985 | Dones et al. | 174/76 X |
| 4,509,821 | 4/1985 | Stenger | 523/173 |
| 4,556,464 | 12/1985 | St. Clair | 204/159.15 |
| 4,610,738 | 9/1986 | Jervis | 174/92 X |
| 4,617,422 | 10/1986 | Hagger | 524/476 |
| 4,618,213 | 10/1986 | Chen | 524/505 |
| 4,676,384 | 6/1987 | Schafer | 211/184 |
| 4,701,016 | 10/1987 | Gartside, III | 523/173 |
| 4,701,574 | 10/1987 | Shimirak et al. | 174/93 |
| 4,701,576 | 10/1987 | Wada et al. | 174/117 F |
| 4,709,982 | 12/1987 | Corne et al. | 524/505 |
| 4,716,183 | 12/1987 | Gamarra | 522/80 |

FOREIGN PATENT DOCUMENTS

| | | | |
|---|---|---|---|
| 1159536 | 4/1961 | Fed. Rep. of Germany | 174/93 |
| 3528625 | 2/1986 | Fed. Rep. of Germany | 174/93 |

OTHER PUBLICATIONS

St. Clair, Adhesives Age, Mar. 1980, pp. 30–36.

*Primary Examiner*—Morris H. Nimmo
*Attorney, Agent, or Firm*—Bernard J. Lyons; Herbert G. Burkard

[57] ABSTRACT

This invention provides cable sealing apparatus comprising styrene-ethylene-butylene-styrene triblock copolymer-oil compositions which are temperature resistant and nonmeltable. They have a viscosity at 200° C. of at least 200 poise. The compositions can be molded under pressure at elevated temperatures.

33 Claims, 4 Drawing Sheets

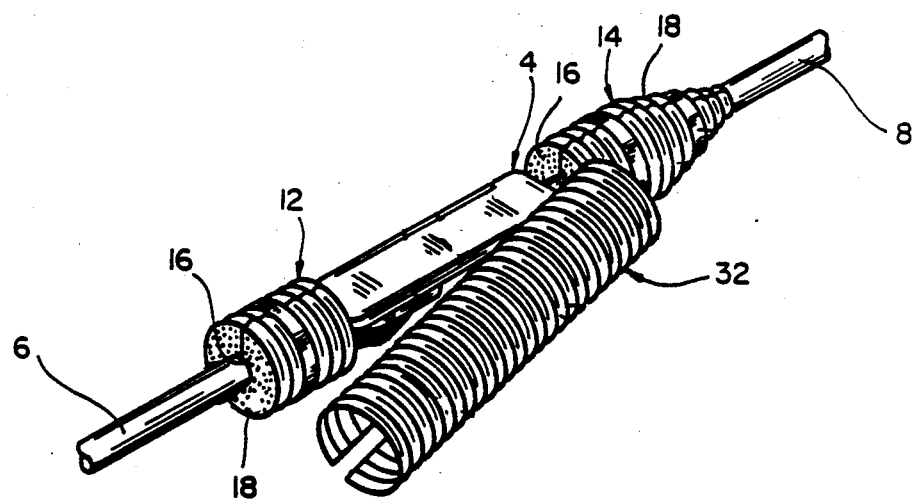
FIG_1a

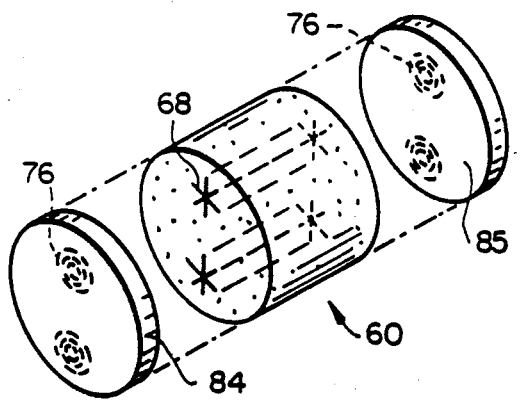
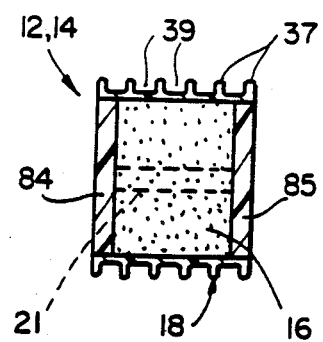
FIG_1b          FIG_2
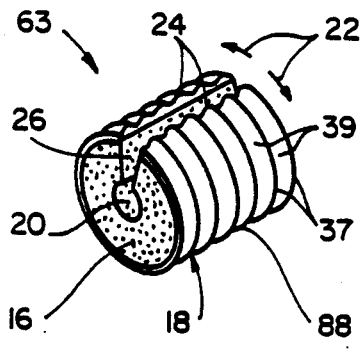
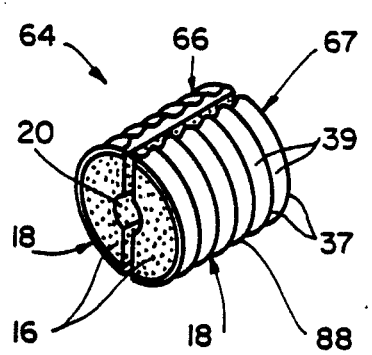
FIG_3          FIG_4
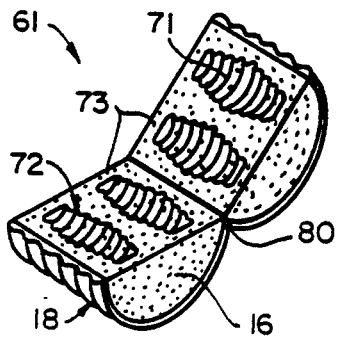
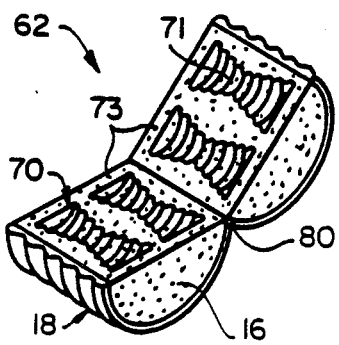
FIG_5          FIG_6

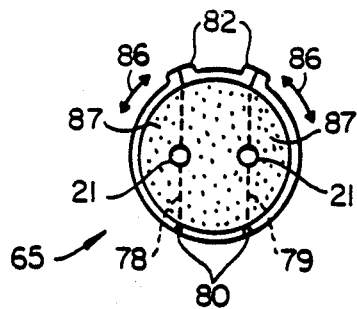
FIG_7
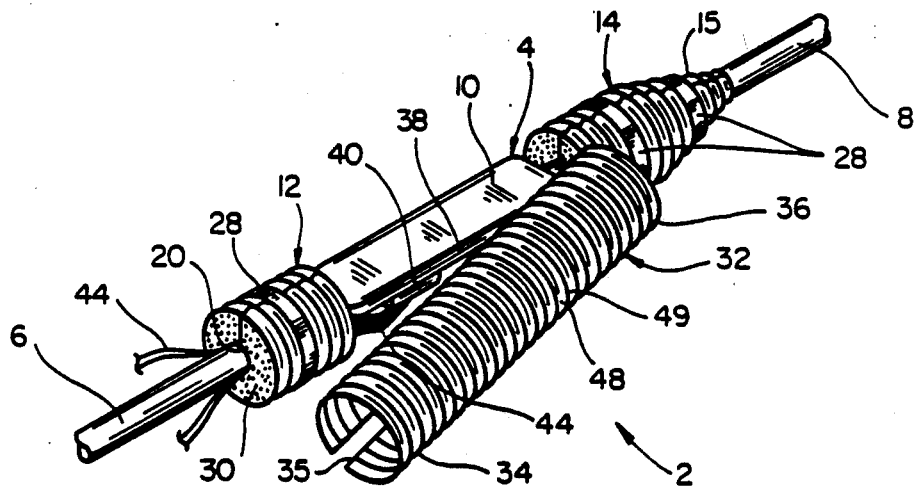
FIG_8
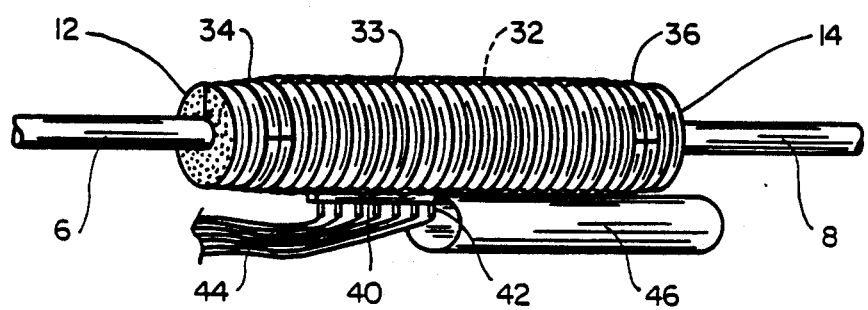
FIG_9

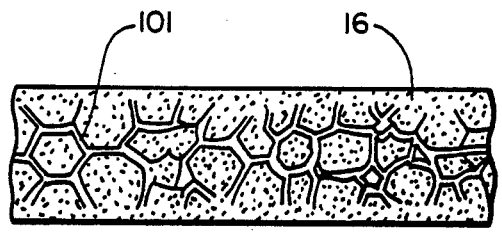
*FIG_10A*
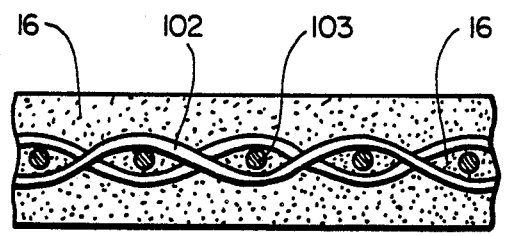
*FIG_10B*

CABLE SEALING APPARATUS COMPRISING HEAT RESISTANT GEL COMPOSITIONS

RELATED APPLICATION

This application is a continuation-in-part of my co-pending application Ser. No. 72,309, filed July 13, 1987, the disclosure of which is incorporated herein by reference.

FIELD OF THE INVENTION

This invention relates to styrene-diene block copolymer compositions containing at least about 70% oil, useful for example in providing environmental sealing or protection especially in the cable accessories industry.

BACKGROUND OF THE INVENTION

Gel compositions comprising styrene-diene block copolymers and hydrocarbon oils wherein the copolymer constitutes up to about 30 parts by weight and the oil constitutes at least about 70 parts by weight are known in the art as well as varous methods of preparing these compositions. Examples of such compositions and their preparation are illustrated in U.S. Pat. Nos. 4,369,284 and 4,618,213 to Chen; U.S. Pat. No. 3,827,999 to Crossland; U.S. Pat. No. 4,176,240 to Sabia; U.S. Pat. No. 3,485,787 to Haefele; and U.S. Pat. No. 3,376,384 to Lindlof; and in my copending application Ser. No. 801,018 filed Nov. 22, 1985 (equivalent to published European application No. 0224389) and now granted as U.S. Pat. No. 4,716,183. The disclosures of these patents and the copending application are incorporated herein by reference. The various compositions within this class of gels have different combinations of physical properties depending on the use intended for the gel.

A styrene-diene block copolymer of particular interest in the present invention is a poly (styrene-ethylene-butylene-styrene) triblock copolymer (SEBS triblock copolymers) which, when combined with sufficient plasticizer, such as a hydrocarbon oil, provides a gel composition having a cone penetration at least about 50, for example in the range of about 50 to at least 290, say about 300 ($10^{-1}$ mm) (ASTM D217-82) and an ultimate elongation of at least 200% (ASTM D412). For example, in Chen U.S. Pat. No. 4,369,284 these triblock copolymers were melt blended with oils to produce a gel-like material which is meltable and useful for cast molding of shaped articles.

I have found that it is desirable to use these SEBS triblock copolymer-oil compositions in various applications, such as in U.S. Ser. No. 698,643 filed Feb. 6, 1985, the disclosure of which is incorporated herein by reference. However, these materials do not have satisfactory resistance to higher temperatures, i.e., at higher temperatures such as 90° C. or higher and in some cases 100° C. or higher, these materials may slump or flow in a manner that causes the material to lose its original shape and its original function. At these higher temperatures some of the prior art compositions also slump, flow and loose oil content which contaminates surrounding equipment.

Therefore, it is an object of this invention to produce SEBS triblock copolymer-oil compositions of the above type having heat resistant characteristics so that they will not lose their dimensional integrity at elevated temperatures.

In my U.S. Pat. No. 4,716,183 heat resistant gels are made by mixing a styrene-diene block copolymer and a hydrocarbon oil at an elevated temperature sufficient to cause the block copolymer to melt and disperse in the oil, and optionally also by crosslinking the resulting material by electron beam radiation. It is an object of this invention to provide improved heat resistant gels without the necessity of using electron beam radiation.

The patents cited above do not meet these objectives and do not disclose the desired heat resistant compositions. Crossland discloses similar block copolymers but are polyisoprene or polybutadiene block copolymers whch are melt blended with oils at a temperature of 50° to 250° C. to produce compositions which are meltable and castable; i.e. they have a very low viscosity at higher temperatures such as 200° C. Haefele contains disclosure similar to Crossland wherein the block copolymers and oil are melt blended at 160° C., and Lindlof contains similar disclosure wherein the polymers are melt blended with the oil at 175° C.

SEBS copolymers have typically not been used with high loadings of oil but have usually been limited to about 50 parts by weight oil and about 50 parts by weight SEBS block copolymer, as illustrated in U.S. Pat. No. 4,556,464 to St. Claire.

Chen, U.S. Pat. No. 4,369,284, however, uses 100 parts by weight SEBS block copolymers with about 300 to about 1600 parts by weight oil to produce meltable, castable compositions by melt blending at about 150° C. to 200° C. Chen teaches that the use of the SEBS block copolymer with low molecular weight oils melt blended at the desired temperature produces the meltable, castable composition having at least 1600% elongation and tensile strengths in the range of about 12 to about 145 psi.

There is no disclosure or suggestion in these cited references of any composition or how to obtain any composition of these types which would be heat resistant and have a viscosity of at least 200 poise at 200° C.

SUMMARY OF THE INVENTION

In one aspect this invention provides a composition comprising:

about 2 to about 30 parts by weight of a poly (styrene-ethylene-butylene-styrene) triblock copolymer having a styrene to ethylene-butylene block ratio of about 27 to 35 styrene blocks to about 65 to 73 ethylene-butylene blocks, and having a molecular weight of at least 100,000; and about 70 to about 98 parts by weight of a plasticizer, for example a hydrocarbon oil;

wherein the triblock copolymer and the plasticizer have been (a) melt blended and (b) at sufficiently high temperature or under sufficiently high shear have been treated to cause the composition to have a cone penetraton of at least about 50 for example in the range of about 50 to at least 290, say about 300 ($10^{-1}$ mm), an ultimate elongation of at least about 200% and a viscosity at 200° C. of at least 10 poise, often at least 200 poise.

In general, I prefer that the heat treatment be at a temperature of at least 180° C. The heat-treatment may be simaltaneous with melt blending of the components or it may occur subsequently, for example as part of an extrusion or melting step or may be carried out alone. For many applications I prefer that the temperature treatment is accompanied by shear.

In another aspect this invention provides a method of preparing a composition comprising:

about 2 to about 30 parts by weight of a poly (styrene-ethylene-butylene-styrene) triblock copolymer having a styrene to ethylene-butylene block ratio of about 27 to 35 styrene blocks to about 65 to 73 ethylene-butylene blocks, and having a molecular weight of at least 100,000; and about 70 to about 98 parts by weight of a plasticizer, for example a hydrocarbon oil;

wherein the triblock copolymer and the plasticizer have been melt blended or a mixture thereof has been moulded or extruded at sufficiently high temperature to cause the composition to have a cone penetration of at least about 50 for example in the range of about 50 to at least 290, say about 300 ($1^{-1}$ mm), an ultimate elongation of at least about 200% and a viscosity at 200° C. of at least 10 poise;

which comprises melt blending the triblock copolymer and the plasticizer or moulding or extruding a mixture thereof at a temperature above about 180° C.

In another aspect this invention provides a method of preparing a composition comprising:

about 2 to about 30 parts by weight of a poly (styrene-ethylene-butylene-styrene) triblock copolymer having a styrene to ethylene-butylene block ratio of about 27 to 35 styrene blocks to about 65 to 73 ethylene-butylene blocks, and having a molecular weight of at least 100,000; and about 70 to about 98 parts by weight of a plasticizer, for example a hydrocarbon oil;

wherein the triblock copolymer and the plasticizer have been melt blended or a mixture thereof has been moulded or extrued under sufficiently high shear to cause the composition to have a cone penetration of at least about 50 for example in the range of about 50 to at least 290, say about 300 ($10^{-1}$ mm), an ultimate elongation of at least about 200% and a viscosity at 200° C. of at least 10 poise;

which comprises high shear blending the triblock copolymer and the plasticizer or high shear moulding or extruding a mixture thereof at a temperature above about 100° C.

In many cases, the triblock copolymer will have a styrene to ethylene-butylene block ratio of 29 to 35 styrene blocks to 65 to 71 ethylene-butylene blocks. An example is Kraton G-1651 (trade mark) marketed by Shell Oil Company.

BRIEF DESCRIPTION OF THE DRAWINGS:

FIG. 1A shows a partially disassembled splice case around a cable splice.

FIG. 1B illustrates a first preferred embodiment of an end seal of the invention having intersecting slits within a gel portion through which a cable can extend;

FIG. 2 is a side view of another embodiment of an end seal of the invention, FIG. 2 illustrating detailed structure of a convoluted tubing around the gel;

FIGS. 3 and 4 illustrate further preferred embodiments of the end seal of the invention;

FIGS. 5 and 7 illustrate further preferred embodiments of end seals useable for branch-off applications; and FIGS. 8 and 9 illustrate additional preferred embodiments of a cable closure for which end seals of the invention are useable.

FIGS. 10A and 10B illustrate two preferred embodiments of a flexible matrix impregnated with a gel useable with the present invention.

In FIG. 10A, the flexible matrix is identified by reference numeral 101, and in FIG. 10B by reference numerals 102, 103, the gel being identified by reference numeral 16 in both figures.

DESCRIPTION OF THE INVENTION

The compositions of the present invention comprise SEBS triblock copolymer-oil (or other platicizer) compositions comprising about 2 to about 30 parts by weight block copolymer and about 70 to about 98 parts oil. In general, it is preferred that these compositions contain about 5 to about 30 parts by weight block copolymer and 70 to 95 parts oil and it is most preferred for some applications that the composition comprise between about 5 and about 25 parts by weight triblock copolymer and about 95 to about 75 parts by weight oil.

The SEBS triblock copolymer-oil compositions of this invention have a cone penetration at least about 50 ($10^{-1}$ mm) (ASTM D217-82) and an ultimate elongation of at least 200% (ASTM D412). Preferred compositions will have cone penetration in the range of about 50 to about 300 often from 50-200 ($10^{-1}$ mm) and ultimate elongation of at least about 200%, preferably in the range of about 200 to about 1200%, more preferably between about 300 and 1100% and most preferably between about 400 and 1100%.

The heat resistant compositions of the present invention have a viscosity at 200° C. of at least 10 poise, particularly at least 100 poise, preferably at least 200 poise, more preferably at least 400 poise and most preferably at least 500 poise at 200° C. In general, there is an increase, often a steep increase, in viscosity as the concentration of the SEBS polymer is increased. Depending on the precise materials, softer compositions may be expected to contain 5-20% by weight of SEBS, and the preferred harder compositions 10-30% by weight of SEBS. Brookfield viscosities may be obtained for the softer compositions and for harder compositions dynamic viscosity measurements may be carried out on a Rheometrics Mechanical Spectrometer (RMS-605).

The SEBS triblock copolymers useful in the present invention have a ratio of polystyrene blocks to polyethylenebutylene blocks in the range of about 27 to 35 styrene blocks to 65 to 71 ethylene-butylene blocks, more preferably in the range of 32 to 34 styrene blocks to 66 to 68 ethyene-butylene blocks, and most preferably the ratio will be 33 styrene blocks to 67 ethylene-butylene blocks. In general, a decrease in tensile strength and other mechanical properties may be expected when reducing the polystyrene content, say from 32%. This may be due to the resulting reduction in molecular weight. The average molecular weight of the SEBS triblock copolymer is important for the present invention, and values given in this specification are weight average molecular weights determined in solution by gel permeation chromatograpbly standardized with reference to and expressed as polystyrene. I have found that the total molecular weight of the SEBS triblock copolymer is of greater importance than the ratio between the molecular weights of the polystyrene and ethylene-butylene blocks. This has not been appreciated in the prior art. I prefer a total molecular weight of more than about 100,000, and preferably one in the range of 100,000 to 500,000, more preferably one in the range of about 150,000 to about 400,000, most preferably in the range of about 200,000 to about 300,000 and in some applications it is preferred that the SEBS triblock copolymer have a molecular weight in the range of about 250,000 to about 280,000. Preferred molecular weights of the polystyrene end blocks and of the ethylene-butylene center blocks can be calculated from the preferred total molecular weight and preferred ratios given above.

In general, the plasticizer should be chosen bearing in mind its solubility parameters, which will usually be a function of molecular weight. Although I do not wish to be bound by any theory, I believe that the reason is as follows. When a SEBS copolymer is heated above the $T_g$ of the polystyrene domains, those domains are disrupted and polystyrene segments flow from one such domain to another, through the thermodynamically incompatible ethylene-butylene phase. If the SEBS polymer is heated in the presence of a plasticizer having a solubility parameter (with respect to polystyrene) lower than that of the ethylene-butylene midblock, i.e. being less compatible with polystyrene, then the tendency will be greater for polystyrene segments to agglomerate back together into polystyrene domains. Once this happens, even higher energy will be required for further disruption. Hence the great heat stability after initial high heating.

The oils useful in the composition of the present invention may be oils disclosed in the above patents and copending applications where the oil has a molecular weight in the range of about 400 to about 2500, preferably about 420 to about 2000, and most preferably about 450 to about 1500. It is also preferred that the oil have a solubility parameter in the range of about 6.0 to about 8.5 and preferably in the range of about 6.5 to about 8.0, typically 6.5 to 7.8. Particularly preferred oils include paraffinic and/or naphthenic oils, synthetic polyalphaolefin oils, polypropylene oils and polybutene oils having these properies. Blends of two or more of these oils may be used. In general, the solubility parameter of the oil will decrease (as is desired) with an increase in molecular weight. In the case of paraffinic/naphthenic oils, the solubility parameter decreases for increasing paraffin content.

The heat resistant nonmeltable compositions of the present invention may be prepared by mixing the SEBS triblock copolymer and the oil, or other plasticizer, in processes similar to those recited in the patents and copending applications cited above; however, the prior art methods do not provide a transition of the SEBS triblock copolymer-oil composition from a meltable, pourable or castable composition to a heat resistant, nonmeltable composition. The heat resistant, nonmeltable compositions of the present invention are obtained by providing sufficient energy into the composition during mixing and preparation to accomplish this transformation into a heat resistant, nonmeltable composition. A clear and/or homogeneous mix is in general produced before this transformation, and it is only this precursor mix that has been produced by prior art methods, and then only for some of the materials referred to herein. The energy required can be provided either by high temperature melt blending or high shear blending at lower temperatures. It has been found that the compositions of the present invention can be prepared by melt blending at temperatures above 180° C. to achieve the required transformation of the composition into a heat resistant, nonmeltable composition. The time required will vary depending on the temperature, degree of mixing, ratio of polymer to oil and other factors. Preferably the compositions of the present invention are prepared by melt blending at at least 190° C. and more preferable at temperatures of about 200° C. and above. It is most preferably to use temperatures above 200° C. The melt blending is preferably performed in the range of 180 to 270° C., more preferably in the range of 190 to 265° C., and most preferably between 200 and 260° C.

Another method by which the heat resistant, nonmeltable compositions of the present invention can be prepared is by high shear mixing at lower temperatures. The required high shear to accomplish the transformation of the SEBS triblock copolymer-oil composition into the heat resistant, nonmeltable composition of this invention can be accomplished in for example a Banbury or Brablender type mixer typically used for preparation of elastomers, rubber compositions, or plastic compositions. The term "high shear" is used in the context of the present invention relative to the energy input required for mixing SEBS triblock copolymers and oil which are normally melt blended at very low shear energy or power inputs. The "high shear" mixing according to the present invention can be conducted at a temperature of at least 100° C., preferably at least 110° C., and more preferably at least 120° C.

The heat resistant, nonmeltable SEBS triblock copolymer oil compositions of the present invention have various uses as disclosed in the patents and patent applications cited above wherein the compositions of the present invention provide improved performance because of the high temperature resistant, nonmeltable properties of the compositions of the present invention. The compositions of the present invention will find other uses such as but not limited to use as pressure sensitive adhesives where performance is desired at higher temperatures (see St. Clair, *Adhesives Age*, March 1980, pp. 30–36.)

In particular, the compositions may provide environmental sealing or protection particularly in the cable accessories industry. For example, the compositions may be used to seal between a substrate to be protected (such as a cable or an electrical terminal) and a housing that surrounds it, or between two parts of such a housing. Thus the composition allows a sealed enclosure to be formed simply by bringing the composition into contact with the substrate, or with a housing, and optionally maintaining the composition under compression. Thus, heat-shrinkable articles (commonly used as cable accessories) may be avoided.

In the following examples, the SEBS triblock copolymer is Kraton G1651 (trade mark), available from Shell Oil Co. and having a styrene copolymer to ethylene-butylene copolymer block ratio of 33 to 67.

EXAMPLE 1

Three compositions are formed each using 20 parts by weight Kraton G1651 and one part by weight Irganox 1010 (trade mark) stabilizer. Each of the three compositions is formed using 79 parts of a polybutene oil. The composition is formed by adding approximately one-half of the oil to the polymer and melt blending in a mixer at a temperature between about 180° C. and 220° C., until the polymer is well dispersed in the oil and then the remaining one-half of the oil is added and mixed for about one hour. The actual temperature used depends on the oil used. The temperature is elevated until a clear gel is observed and is then further heated so that the transition to a nonmeltable temperature-resistant gel takes place. The first composition is made using a polybutene Indopol L-50 (trade mark) available from Amoco and having a molecular weight of about 420. The transition for this composition can be seen as low as 180° C. and the viscosity of this composition at 200° C. is about 1300 poise. The second composition is prepared using Indopol H-50 (trade mark) having a molecular weight of about 750. The viscosity of this second composition at 200° C. is about 800 poise. The third composition is prepared using Indopol H-300 (trade mark) having a molecular weight about 1290 and the viscosity of the resulting composition at 200° C. is about 1200 poise.

EXAMPLE 2

In this example, 20 parts Kraton G-1651 is premixed in a Henschel mixer with about 40 parts oil for about 4 minutes then added to a Banbury f-80 mixer together with an additional 39 parts oil and 1 part Irganox 1010 and mixed at 110° C. for about 8 minutes. The total power input is about 0.08 kw per pound (0.176 Kw per Kg) of composition. The composition is dumped from the banbury and mixed through an extruder for approximately an additional 5 minutes and extruded through a 200 mesh screen to produce the final product. The oil in this example is Drakeol 34 (trade mark) which is a paraffinic/naphthenic oil having a paraffin/naphthene ratio of 72/28 and a molecular weight of about 490. The final product is collected and molded using heat and pressure to form a shaped article which is nonmeltable and is heat resistant.

It has been found that the compositions of the present invention can be used by injection molding the composition to form desired shaped articles. While these compositions are not meltable or castable and have very high viscosities even at elevated temperatures, they can be molded under pressure at elevated temperatures. In some cases the shaped articles can be formed under moderate pressures with long heat soak times and in others the shaped articles can be formed under high pressure with shorter times required at elevated temperatures. The term "nonmeltable" is used herein to mean that the compositions begin to degrade, decompose or break down in some manner before they reach a temperature at which the composition will melt and become pourable.

The invention is further illustrated with reference to the accompanying drawings.

FIGS. 1A to 7 illustrate various embodiments of end seals constructed in accordance with the teachings of the present invention, the end seals being particularly adapted for use in constructing closures such as those illustrated in FIGS. 8 and 9.

Preferably, the end seals of FIGS. 1A to 7 all include a gel which includes an open loop network, preferably a three-dimensional polymeric structure, with the gel having finite elongation properties and being relatively soft. Specifically, it is preferred to use a gel 16 of any of the types described and claimed in U.S. Pat. No. 4,600,261 issued July 15, 1986; U.S. Pat. No. 4,634,207, issued Jan. 6, 1987; and now abandoned application Ser. No. 507,435 filed June 23, 1983; all assigned to the assignee of the present invention, the disclosures of which are incorporated herein by reference. In particular, the gel 16 preferably comprises a material having a cone penetration between 80 and 350, preferably between 100 and 350, more preferably between 200 and 300, and most preferably between 240 and 270 ($10^{-1}$ mm); and an ultimate elongation of at least 50%. All cone penetration values cited herein are determined in accordance with American National Standard Designation ASTM D217-68 on an undisturbed sample at 70° F.±5° F. using a standard 1:1 scale cone (cone weight 102.5 g, shaft weight 47.5 g), the penetration being measured after five seconds. Also, ultimate elongations are determined in accordance with the American National Standard Designation ASTM D638-80, at 70° F.±5° F., using a Type 4 die to cut the sample and at a speed of 50 cm/minute. Preferably, the gel has an ultimate elongation of at least 100%, and more preferably of at least 200%. The gel can comprise either a urethane, silicone, or a non-silicone liquid rubber being liquid butyl rubber. Preferably, the gel is formed so as to have a relatively tacky surface, though nontacky gels can be used as well. The gels 16 of the types described, due to their relatively soft nature and elastic properties as well as elongation properties tend to make excellent water barriers when placed under compression since the gels tend to stay intact and do not ooze out and flow as does a grease, especially when subjected to temperature and humidity cycling. Also, preferably an adhesive strength of the gel 16 with a member to which it is secured and contained within, in this case convoluted tubing 18, is greater than a cohesive strength of the gel to itself which results in the gel 16 being secured to the tubing 18.

Various means are illustrated which are formed in the gel to allow passage of a cable therethrough so that an end seal can be formed for the cable when it is passed through the gel. FIGS. 1, 2, 5, 6, 7 illustrate various configurations useful for branch-off situations wherein more than one cable is to be passed through the end seal 12, 14, 60, 61, 62, 65, whereas FIGS. 3 and 4 illustrate embodiments where a single cable is to be passed through the end seal 63, 64 and it can readily be appreciated that the shapes of the passage formed means in the branch-off situations can be incorporated into the non-branch-off situations and vice versa.

In FIG. 1, a plurality of intersecting slits 68 are formed in the gel throughout an axial length thereof, such slits being easily formed using various types of cutting tools, a preferred embodiment being a laser, with a width of the slits being preferably greater than the maximum expected cable diameter to be accommodated. The slits 68 are advantageous in that water or moisture cannot propagate axially therethrough when a cable does not extend through the slits, and even subsequent to removing a cable previously contained within the slits 68.

In the embodiments of FIGS. 2 to 8 axial bores 20, 21 are formed in the gel to allow passage of a cable therethrough, preferably a diameter of the cables so as to place the gel in elastic compression subsequent to placing the cable in the bores. In the embodiments of FIGS. 5 and 6, bores 70, 72 are formed only within an interior portion of the gel such that opposite end faces of the gel have sealed surfaces 73 to allow the cable to be inserted into the bore 70, 72. The bores 70, 72 preferably have conical shapes, with the embodiment of FIG. 5 illustrating a shape wherein a smallest most diameter portion of the bore is adjacent end of the bore whereas in the embodiment of FIG. 6 a smallest diameter portion of the bore 70 is located approximately mid-way through the gel. Furthermore, preferably the conical bores 70, 72 further include a series of ridges and valleys similar to those formed on the convoluted tubing 18 identified by reference numerals 37 and 39, the ridges and valleys which are identified generically as ribs 71 forming multiple tight seals around a cable inserted within the bores 70, 72 so as to provide an excellent barrier against axial water propagation therewithin.

In the embodiment of FIG. 3, the end seal 63 comprises a slit elongated member which can be hand-pried open by moving confronting faces 24 in a direction of arrows 22 so that the cables 6 or 8 (FIG. 8) can be inserted into the axial bore 20 through opening 26. In the embodiment of FIG. 4, the end seal comprises two half cylinders, each having gel therein which again is shaped so as to form an axial bore 20 when assembled, with each half cylinder being placed around opposite circumferential sides of the cable 6, 8. Tape, tie wraps, or other securing means 28 (FIG. 8) is wrapped around the end seal 63 or 64 to secure in place and compress the gel around the cables 6, 8.

In the embodiments of FIGS. 5 to 7, hinge members 80 are formed on part of the member 18, in this case convoluted tubing 18, which allows opening and closing of the gel, and FIG. 7 illustrates a clamping means 82 which can be used to secure the convoluted tubing 18 in places subsequent to placing cables within the bores 21, 70, or 72. In FIG. 7, reference numerals 78, 79 illustrate slits formed in the gel which allow movement of portions 87 of the gel along the direction of arrows 86.

According to another preferred embodiment, first and second end member 84, 85 illustrated in FIGS. 1B and 2 are placed on opposite end faces of the gel 16 to environmentally protect the gel. FIG. 1B illustrates one preferred embodiment for inserting cables through the end members 84, 85, this embodiment comprising a plurality of concentrically arranged perforations 76 formed in the end members.

In use, when a cable is to be inserted through the end seal 60 as illustrated in FIG. 1, a concentric circle of perforations 76 slightly larger than the size of the cable to be inserted within the end seal is removed from the members 84, 85 so that the cable can be inserted therethrough, and since the gel is conformable and elastic, the cable can easily be inserted through any of the passage forming means disclosed in the various embodiments, reference numeral 68 illustrating one embodiment in FIG. 1.

As is best illustrated in FIG. 2, 5 and 6, the convoluted tubing 18 comprises a series of ridges 37 and valleys 39, the embodiment of FIG. 2 illustrating relatively wide valleys 39 and relatively narrow ridges 37, with the embodiments of FIGS. 5 and 6 illustrating more or less sinusoidal shaped valleys and ridges. The valleys and ridges give the tubing 18 a convoluted appearance, the tubing 18 preferably formed out of soft, durable plastic which can be easily molded into a desired shape. According to the construction of the tubing 18, water or moisture is positively prevented from propagating axially down the end seal along an out surface 88 (FIGS. 3 and 5) of the end seals since the water is trapped between adjacent ridges and accordingly flows circumferentially around the end seal around the outer surface 88 of the tubing 18 and is removed from the end seal by gravitational forces. In addition, since the gel 16 is maintained in compression due to the unique formation of the various embodiments of the passage forming means 20, 21, 68, 70, 72 and by any additional compression means, such as securing means 28, axial water penetration along an outer surface of the cable is also prevented. Hence, it can be appreciated that the end seals of the invention provide an excellent barrier against water, and keep water and moisture from a junction 4 to be enclosed by a closure 2 (FIGS. 8 and 9).

FIG. 1A shows a partially disassembled splice case around a cable splice.

Two cables 6 and 8, for example telecommunications cables, are joined at a splice region 4. The splice region is sealed by means of a splice case comprising end pieces 12 and 14 around the cables at each side of the splice and a central portion 32 that bridges the end pieces. It is shown prior to positioning around them.

The end pieces 3 may comprise supports or casings 18 containing a sealing material 16. The sealing material may comprise the composition of the invention. This design of splice case is marketed by Raychem under the trade mark TRAC, and is disclosed and claimed in U.S. Pat. No. 4,701,574 (Raychem), the disclosure of which is incorporated herein by reference.

One preferred use of the various type end seals of the invention is illustrated in FIGS. 8 and 9, the end seals being used as part of a closure 2 for surrounding a cable junction 4 between first and second cables 6, 8 which functionally form a single cable, the junction 4 being a splice region, a repair region, a dropwire region, etc. Sections of the cables adjacent opposite ends of the junction 4 are sealed by first and second end seals 12, 14, which can be constructed according to any of the embodiments of FIGS. 1 to 7.

In the embodiments of FIGS. 8 and 9, a cone-shaped member 15 is disposed adjacent the end seal 14, the coneshaped member being either formed integrally with seal 14 or separable therefrom, the member 15 being useful when the closure 2 is to be installed in a substantially vertical orientation with the end seal 14 being at a higher elevation than the end seal 12. The cone-shaped member 15 facilitates removal of water running down an outer surface of a jacket of the cable 8 toward the junction 4.

The closures of FIGS. 8 and 9 further include a crush resistant slit convoluted tube 32 preferably formed from a relatively strong but flexible plastic material. The convoluted tube 32 includes a plurality of ridges and valleys 48, 49 similar in shape, but not necessarily identical in shape, with the ridges and valleys 37, 39 formed on the tubing 18 of the end seals, and are engageable therewith. Through the preferred embodiments illustrated show convolutions throughout the length of the tubing 32, it should be appreciated that such convolutions are only required in a vicinity where the tubing 32 engages with the end seals. However, if the convolutions or ridges and valleys are provided throughout a length of the tubing 32, additional advantages of water blockage are achieved since any water which may get past the end seals would have to further migrate over further ridges and valleys of the tubing 32. Also, the uniform configuration of the tubing 32 gives flexibility in product design since the closure 2 can be supplied to a craftsman in a plurality of parts, the parts including end seals of any of the types illustrated, along with a reel of extended length of tubing 32. Accordingly, when a junction 4 is to be enclosed, the craftsman simply installs the end seals 12, 14 and thereafter simply cuts a predetermined length of tubing to produce a desired specified tailor formed closure.

As indicated, the convolutions of the tubing 18, 32 provide a very effective blockage means. In addition the convolutions adds strength to the tubing 32 and provide it with flexibility in bending which is a significant advantage for closures of an aerial type wherein the closure is oftentimes subjected to severe side loads from wind gusts.

In the embodiments of FIGS. 8 and 9, the convoluted tubing 32 is illustrated as being slit by reference numeral 35, and accordingly easy installation thereof is facilitated since a craftsman simply spreads opposed ends of the tubing 32 apart and slips it over the end seals 12, 14. If an appropriate material is used, the craftsman can simply handpry open the flexible tubing 32 and secure it around the junction 4 in the field. In addition, the convolutions allow the tubing to have a variable length since they can easily accommodate contractions and expansions, and accordingly strains within the tubing are more effectively handled when temperature variations cause the cables 6, 8 to expand or contract.

If desired, means can also be included for terminating conductors of the cables 6, 8. In FIG. 8, a termination mounting bar 38, made of an insulating means, such as tape, and a termination 40 having conduction ports 42 is attached thereto. Drop wires 44 are electrically connected to the ports 42, and in the embodiment of FIG. 8, exit the closure via one of the longitudinal bores 20 of the end seals 12, 14. In this embodiment, the tubing 32 has a diameter such that it surrounds the bar 38, termination 40, and ports 42 as well as the junction 4.

FIG. 9 illustrates an alternative embodiment wherein the termination 40 extends beneath the convoluted tube 32 and in this embodiment a shaped, split housing 46 has means such as channels which engage opposite ends of the termination 40 and is capable of sliding along a longitudinal axis of the closure so as to expose the ports 42 and alternatively cover them up to protect them from the environment. The external mounted termination of FIG. 2 allows the wires 42 to bypass the end seals 12, 14. Of course, the provision of a termination is optional and is not required with the closure of the invention.

A further optional feature of the invention illustrated in FIG. 9 is the provision of a second convoluted, slit tube 33 disposed concentrically around the first convoluted, split tube 32 which adds further resistance to water ingress into the junction 4. If the slits of the tubes are circumferentially offset, say by 180, the two tubes 32, 33 render the closure quite suitable for buried cable closure environments, and an inside termination mounting arrangement as illustrated in FIG. 1 could also be included, if this feature were desired.

What is claimed is:

1. A cable sealing apparatus, comprising: a first end seal, the first end seal comprising a layer of gel which comprises:
   (1) about 2 to about 30 parts by weight of a poly(styrene-ethylene-butylene-styrene) triblock copolymer having a styrene to ethylene butylene block ratio of about 27 to 35 styrene blocks to about 65 to 73 ethylene butylene blocks, and having a molecular weight of at least 100,000; and
   (2) about 70 to about 98 parts by weight of a plasticizer; wherein the triblock copolymer and the plasticizer have been
      (a) melt-blended and
      (b) have been treated
         (i) at sufficiently high temperature or
         (ii) under sufficiently high shear
      to cause the composition to have a cone penetration of at least about 50 ($10^{-1}$ mm), an ultimate elongation of at least about 200% and a viscosity at 200° C. of at least 10 poise;

the layer of gel including
   (A) means formed therein for passage of the cable to be sealed therethrough between inner and outer opposite faces of the gel, the cable to be sealed being held in contact with the gel formed means;
   (B) a convoluted member forming an outer circumferential surface of the gel, the convoluted member having a series of ridges and valleys extending circumferentially therearound;
   (C) a first member disposed adjacent to and in contact with an outer face of the gel and having means formed therein to facilitate passage of the cable to be sealed therethrough;
   (D) a second member disposed adjacent to and in contact with an inner face of the gel and having means formed therein to facilitate passage of the cable to be sealed therethrough; and
   (E) gel formed means comprising a plurality of longitudinal slits extending through the gel, a width of at least one of the slits being greater than a diameter of the cable to be sealed.

2. The apparatus according to claim 1, wherein the viscosity of said layer of precured gel at 200° C. is at least 100 poise.

3. The apparatus according to claim 1, wherein the molecular weight of the triblock copolymer is about 150,000 to about 300,000.

4. The apparatus according to claim 1, wherein the plasticizer comprises a hydrocarbon oil having a molecular weight of about 400 to about 2500.

5. The apparatus according to claim 1, wherein the plasticizer comprises a hydrocarbon oil having a solubility parameter of about 6.0 to about 8.5.

6. The apparatus according to claim 1, wherein the gel is disposed in a flexible matrix comprising a material having a plurality of open interstices having an average volume of less than 0.01 inches, the gel including a plurality of interconnected segments which lie within the interstices of the matrix.

7. The apparatus according to claim 6, wherein the first end seal further comprises means for securing the convoluted member and precured gel around a cable.

8. The apparatus according to claim 6, wherein the first end seal is a slit elongated disc.

9. The apparatus according to claim 8, wherein the first end seal includes means for connecting portions of the disc in a hinged manner to allow opening and closing thereof, and further includes means for closing the disc portions.

10. The apparatus according to claim 9, further comprising a first bridging member having a convoluted inner surface at opposite ends thereof engageable with the first convoluted member and second convoluted member of the first end seal and second end seal, respectively.

11. The apparatus according to claim 10, wherein the bridging member has an entire outer and inner surface thereof convoluted and has an inside diameter at the opposite ends thereof which is substantially equal to an outside diameter of the first and second end seals, respectively.

12. The apparatus according to claim 10, wherein the first and second end seals and the bridging member form a closure for a junction in a cable, the first and second end seals being adapted to be disposed around the cable adjacent opposite sides of the junction to be formed with the bridging member being adapted to be disposed around the junction to be formed and around at least part of each of the first and second end seals.

13. The apparatus according to claim 12, further comprising a second bridging member disposed around the first bridging member, the second bridging member being convoluted at opposite ends thereof.

14. The apparatus according to claim 10, further comprising means for forming a cone-like shaped member adjacent at least one of the end seals.

15. A splice cable closure, comprising: first and second ends seals, each of which seals comprises a convoluted disc
   (A) having convolutions on an outer cylindrical surface thereof and
   (B) having a layer of gel on an inside surface thereof shaped so as to form an axial bore therethrough, said layer of gel comprising:
      (1) about 2 to about 30 parts by weight of a poly(styrene-ethylene-butylene-styrene) triblock copolymer having a styrene to ethylene butylene block ratio of about 27 to 35 styrene blocks to about 65 to 73 ethylene butylene blocks, and having a molecular weight of at least 100,000; and
      (2) about 70 to about 98 parts by weight of a plasticizer;
   wherein the triblock copolymer and the plasticizer
      (a) have been melt blended and
      (b) have been treated at sufficiently high temperature or under sufficiently high shear to cause the composition to have a cone penetration of at least about 50 ($10^{-1}$ mm), an ultimate elongation of at least about 200% and a viscosity of 200° C. of at least 10 poise; and
   a bridging member having a continuous convoluted inner surface at opposite ends thereof adapted for engagement with an outer surface of the first and second end seals, the end seals being adapted to be disposed on a cable opposite a cable splice, the bridging member being adapted to be disposed around the splice.

16. The closure of claim 15, wherein the bridging member is split longitudinally.

17. The closure of claim 16, wherein one of the end seals is a split, elongated disc.

18. The closure of claim 16, wherein one of the ends seals comprises first and second half cylinders.

19. The closure of claim 15, wherein the bridging member has an entire outer and inner surface thereof convoluted and has an inside diameter at the opposite ends thereof which is substantially equal to an outside diameter of the first and second end seals, respectively.

20. The closure of claim 19, wherein the bridging member has a tube like shape.

21. The closure of claim 15, wherein the first and second end seals and bridging member form a closure for a junction to be formed in an electric cable, the first and second end seals being adapted to be disposed around the cable adjacent opposite sides of the junction to be formed and the bridging member being adapted to be disposed around the junction to be formed and around at least part of each of the first and second end seals.

22. The closure of claim 21, further comprising a second bridging member disposed around the first bridging member, the second bridging member being convoluted at opposite ends thereof.

23. The closure of claim 21, further comprising means for urging the gel of the first and second end seals into contact with the cable at the opposite sides of the junction.

24. A kit of parts capable of being assembled into a splice enclosure comprising:
   a convoluted disc
   (A) having convolutions on an outer cylindrical surface thereof and
   (B) having a layer of gel on an inside surface thereof shaped so as to form an axial bore therethrough, said layer of gel comprising:
      (1) about 2 to about 30 parts by weight of a poly(styrene-ethylene-butylene-styrene) triblock copolymer having a styrene to ethylene butylene block ratio of about 27 to 35 styrene blocks to about 65 to 73 ethylene butylene blocks, and having a molecular weight of at least 100,000; and
      (2) about 70 to about 98 parts by weight of a plasticizer;
   wherein the triblock copolymer and the plasticizer
      (a) have been melt blended and
      (b) have been treated at sufficiently high temperature or under sufficiently high shear to cause the composition to have a cone penetration of at least about 50 ($10^{-1}$ mm), an ultimate elongation of at least about 200% and a viscosity at 200° C. of at least 10 poise; and
   a bridging member having a continuous convoluted inner surface at opposite ends thereof adapted for engagement with an outer surface of the first and second end seals, the end seals being adapted to be disposed on a cable opposite a cable splice, the bridging member being adapted to be disposed around the splice.

25. The kit-of-parts of claim 24, wherein the bridging member has an entire outer and inner surface thereof convoluted and has an inside diameter at the opposite ends thereof which is substantially equal to an outside diameter of the first and second end seals, respectively.

26. The kit-of-parts of claim 25, wherein the viscosity of said layer of precured gel at 200° C. is at least 100 poise.

27. The kit-of-parts of claim 25, wherein the molecular weight of the triblock copolymer is about 150,000 to about 300,000.

28. The kit-of-parts of claim 25, wherein the plasticizer comprises a hydrocarbon oil having a solubility parameter of about 6.0 to about 8.5.

29. The kit-of-parts of claim 28, wherein the first and second end seals and bridging member form a closure for a junction in an electric cable, the first and second end seals being adapted to be disposed around the cable adjacent opposite sides of the junction to be formed with the bridging member being adapted to be disposed around the junction to be formed and around at least part of each of the first and second end seals.

30. The kit-of-parts of claim 29, further comprising a second bridging member disposed around the first bridging member, the second bridging member being convoluted at opposite ends thereof.

31. The kit-of-parts of claim 29, further comprising means for urging the gel of the first and second end seals into contact with the cable at the opposite sides of the junction.

32. The kit-of-parts of claim 31, further comprising means for mounting a termination adjacent a junction surrounded by the closure.

33. The kit-of-parts of claim 32, wherein the termination mounting means includes means for mounting the termination outside of the bridging member after installation thereof.

* * * * *